(12) United States Patent
Sunkavalli et al.

(10) Patent No.: US 10,950,037 B2
(45) Date of Patent: Mar. 16, 2021

(54) DEEP NOVEL VIEW AND LIGHTING SYNTHESIS FROM SPARSE IMAGES

(71) Applicant: ADOBE INC., San Jose, CA (US)

(72) Inventors: Kalyan K. Sunkavalli, San Jose, CA (US); Zexiang Xu, San Diego, CA (US); Sunil Hadap, Dublin, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/510,586

(22) Filed: Jul. 12, 2019

(65) Prior Publication Data

US 2021/0012561 A1 Jan. 14, 2021

(51) Int. Cl.
*G06T 15/50* (2011.01)
*G06T 7/55* (2017.01)
*G06T 3/00* (2006.01)
*G06T 15/10* (2011.01)

(52) U.S. Cl.
CPC .......... *G06T 15/506* (2013.01); *G06T 3/0093* (2013.01); *G06T 7/55* (2017.01); *G06T 15/10* (2013.01); *G06T 2207/10028* (2013.01); *G06T 2207/20084* (2013.01)

(58) Field of Classification Search
CPC ....... G06T 15/506; G06T 7/55; G06T 3/0093; G06T 15/10; G06T 2207/10028; G06T 2207/20084
See application file for complete search history.

(56) References Cited

U.S. PATENT DOCUMENTS

2004/0196391 A1* 10/2004 Chen .................. G06T 5/50
348/239
2016/0335795 A1* 11/2016 Flynn .................. G06K 9/6272

OTHER PUBLICATIONS

Peiran Ren, Yue Dong, Stephen Lin, Xin Tong and Baining Guo, "Image Based Relighting Using Neural Networks," ACM Transactions on Graphics, vol. 34, No. 4 Article 111, Publication Date: Aug. 2015 (Year: 2015).*
Xu, Zexiang, Kalyan Sunkavalli, Sunil Hadap, and Ravi Ramamoorthi. "Deep image-based relighting from optimal sparse samples." ACM Transactions on Graphics (TOG) 37, No. 4, Aug. 2018:126.

* cited by examiner

Primary Examiner — Sing-Wai Wu
(74) Attorney, Agent, or Firm — Shook, Hardy & Bacon L.L.P.

(57) ABSTRACT

Embodiments are generally directed to generating novel images of an object having a novel viewpoint and a novel lighting direction based on sparse images of the object. A neural network is trained with training images rendered from a 3D model. Utilizing the 3D model, training images, ground truth predictive images from particular viewpoint(s), and ground truth predictive depth maps of the ground truth predictive images, can be easily generated and fed back through the neural network for training. Once trained, the neural network can receive a sparse plurality of images of an object, a novel viewpoint, and a novel lighting direction. The neural network can generate a plane sweep volume based on the sparse plurality of images, and calculate depth probabilities for each pixel in the plane sweep volume. A predictive output image of the object, having the novel viewpoint and novel lighting direction, can be generated and output.

20 Claims, 10 Drawing Sheets

DEEP NOVEL VIEW AND LIGHTING SYNTHESIS FROM SPARSE IMAGES

BACKGROUND

Photographs of an object, such as a product or a good, taken from multiple viewing angles and lighting conditions can be useful for various reasons. For instance, buyers in online marketplaces may desire to view an item from different angles under different lighting conditions. The process of collecting dense (i.e., many) images of an object from all potential viewpoints and all potential lighting positions can be expensive and time consuming. For example, a light stage, having many cameras and lights distributed around an object, can facilitate the capturing of images from all viewing angles and/or lighting conditions. Thus, if a viewer desires to view the object from a particular viewing angle and/or lighting condition, the image taken from the particular viewing angle and/or lighting condition could be retrieved and presented to the user. Light stages are expensive, and generate great amounts of data that need to be stored, organized, and properly presented.

Another conventional technique for presenting objects with different viewing angles and/or lighting conditions relies on sparse (i.e., few) images of an object. By taking sparse photographs of the object from several angles, a 3D model reconstruction of the object can be generated and utilized to render the object from different viewpoints. Reconstructing an object for the purpose of rendering different viewpoints, may work well for rendering simple (e.g., simple, plain, smooth) objects. However, reconstruction is generally difficult and mostly inaccurate for complex (e.g., multi-faceted, obtuse, oddly-shaped) objects. Moreover, sparse image object reconstruction is typically limited to the specific lighting condition at which the sparse images were photographed.

SUMMARY

Embodiments of the present invention are directed towards the automatic generation of an image. More specifically, given a sparse plurality of images, a novel viewpoint, and a novel lighting direction, various embodiments can automatically generate an image, such that an object depicted in the sparse plurality of images, is similarly depicted in the generated image with a novel viewpoint and a novel lighting direction. In the various embodiments, the sparse plurality of images includes a complete collection of images with different viewpoints and different lighting directions. In other words, each image from the sparse plurality of images corresponds to one of a plurality of viewpoints, and one of a plurality of different lighting directions, such that an image corresponds to each possible configuration (i.e., viewpoint, lighting direction).

In some embodiments, a first portion of a neural network generates a sweeping plane volume based on the novel viewpoint and the sparse plurality of images received as input. More specifically, the first portion of the neural network can warp the images at each of a plurality of discrete depth planes given the novel viewpoint, and generate a sweeping plane volume, or in other words, a three-dimensional (3D) volume of data. The two-dimensional (2D) features (i.e., pixels) from all input viewpoints (i.e., the plurality of viewpoints) are warped by projecting them onto each depth plane in front of the novel viewpoint. Thus, a 3D volume of data is generated based on multi-view 2D features (e.g., pixels, RGB values). The generated 3D volume can include a plurality of voxels having a number of channels, whereby the number of channels is a function of a number of viewpoints (i.e., in the plurality of viewpoints), a number of light sources or lighting directions (i.e., in the plurality of lighting directions), and a number of color channels (e.g., RGB: 3 color channels).

In some further embodiments, a second portion of the neural network generates a prediction (i.e., a predictive image) at each of the plurality of depth planes based on the generated 3D volume and the novel lighting direction received as input. More specifically, each lighting direction can be appended to each voxel of the 3D volume generated by the first portion of the neural network. The resulting 3D volume can be processed by the second portion of the neural network based on the novel lighting direction, such that a prediction (i.e., a predictive image) at every depth plane is generated (also referenced herein as "per-plane relit images"). In various embodiments, each generated prediction may include 2D features that are accurate in some portions of the resulting image, and incorrect in other portions of the resulting image, depending on the depth plane in which the 2D features appear.

To determine which pixels amongst the various depth planes of the resulting 3D volume are correct, a third portion of the neural network processes the images from each viewpoint utilizing each of the different lighting directions, to generate a set of feature maps. In other words, the third portion of the neural network transforms photometric stereo data from the sparse plurality of images, for each viewpoint of the plurality of viewpoints, into feature maps that can be used by a fourth portion of the neural network to determine per-pixel depth probabilities. More specifically, the third portion of the neural network generates a feature map for each view, and the first portion of the neural network can be utilized to warp each feature map into a corresponding "viewpoint" volume. A mean and a variance across the "viewpoint" volumes is calculated to generate a new cost volume having a plurality of voxels. A corresponding depth value is appended to each voxel to generate a modified cost volume, which is provided as input to a fourth portion of the neural network. In some embodiments, the fourth portion of the neural network receives the modified cost volume as input, and calculates per-pixel per-plane depth probabilities by applying a soft-max on the output volume along corresponding depth dimensions.

In some embodiments, the neural network determines a weighted-sum of the per-plane relit images utilizing the per-pixel per-plane depth probabilities, which results in a final image that corresponds to the novel viewpoint and the novel lighting direction. In some further embodiments, the neural network can determine a weighted-sum of the per-plane depth values utilizing the per-pixel per-plane depth probabilities, to generate a final depth image or depth map that corresponds to the final image. In this way, in various embodiments, the neural network can generate outputs that include a relit image from a novel view under a novel lighting direction, or a depth image from the novel view.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Technologies that present objects from variable viewpoints and variable light sources have been used in various industries, such as marketing, e-commerce, and others where an object (e.g., a product) is the subject of an inquisitive viewer (e.g., a buyer). Due to the nature of the Internet, buyers must rely on available images to view objects from various angles or lights. Thus, a user that desires to see a product from a particular viewing angle or lighting position, can only view a corresponding image if it is available. Traditional techniques are generally expensive, requiring specialized hardware for capturing images from various viewpoints with various light directions, and also relying on archaic programming tasks that retrieve memory-heavy images that correspond to a selected viewpoint or a selected lighting direction.

Light stages are an example of specialized hardware, having many cameras and lights that are distributed around an object, so that images from all possible viewing angles and/or lighting directions can be captured, stored, and retrieved when given a specific viewpoint or lighting condition. In other words, every possible viewpoint and lighting direction combination must be covered by the many pictures captured via the light stage. Otherwise, any uncaptured combinations would not be available for retrieval, should a user want to see the object from one of the uncaptured viewpoint and lighting combinations. As one would appreciate, the cost of computing resources and storage utilization to capture and store all of the images is high when these traditional techniques are utilized.

Recent developments in three-dimensional rendering techniques have brought forth new ways of presenting objects with different viewing angles. By taking sparse photographs of the object from several angles, a 3D reconstruction (e.g., model) of the object can be generated and utilized to render the object from different viewpoints. While this technique typically works well for simple (e.g., plain, smooth) objects, it does not work well for complex (e.g., multi-faceted, obtuse, oddly-shaped) objects. Moreover, sparse image object reconstruction is typically limited to the specific lighting condition at which the sparse images were photographed and from which the 3D model was generated.

As such, there is a need for a technique that, despite an object's complexity, can generate a realistic image of the object based on sparse images thereof, whereby the object depicted in the generated image corresponds to a novel viewpoint and a novel lighting direction. Various embodiments of the present disclosure are generally related to systems, methods, and computer-readable media, for training and utilizing a neural network of an image relighting and novel view generating system.

Figure 1:
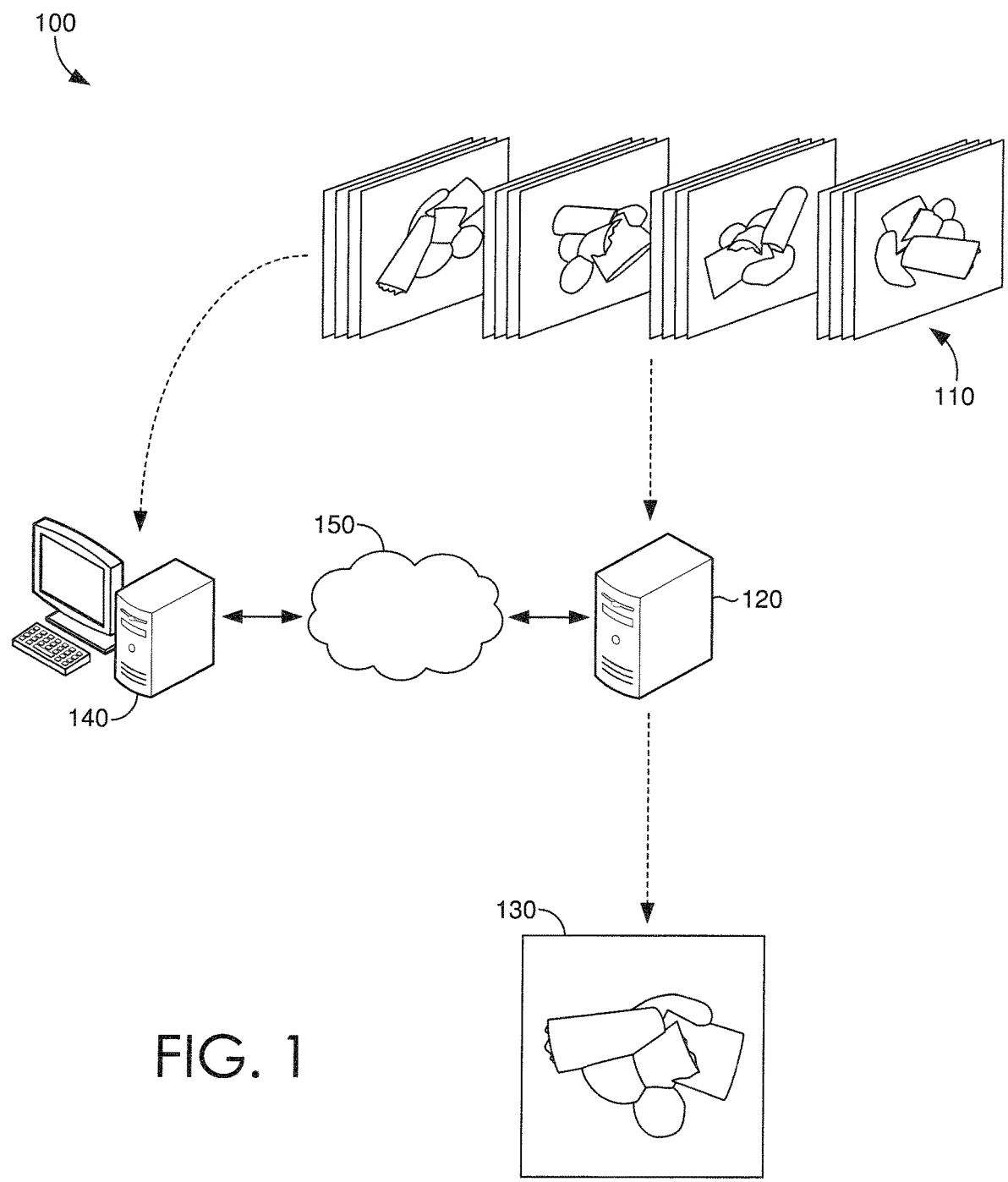
FIG. 1 is an exemplary operating environment for an image relighting and novel view generating system in accordance with some embodiments.

Turning now to FIG. 1, a schematic depiction is provided illustrating an exemplary operating environment 100 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 depicts a sparse plurality of images that are provided as input to one or more servers, such as server 120. The server(s) 120 can include, among other things, one or more neural networks that can receive as input a sparse plurality of images 110 of an object, a novel viewpoint, and a novel lighting direction, and generate as output a novel image 130 of the object corresponding to the novel viewpoint and the novel lighting direction. In some embodiments, the server(s) can also generate as output a depth map of the novel image 130, which can be employed with the novel image 130 for purposes of training the one or more neural networks. In some instances, server(s) 120 can be accessed directly or indirectly over a direct connection or an indirect connection, such a network 150 (e.g., a LAN or the Internet). In a non-limiting example, the server(s) 120 can communicate directly or indirectly with a client device, such as client device 140. It is contemplated, however, that any configuration for accessing, managing, or communicating with the server(s) 120 can be employed. While not shown, a database or any other memory device or storage component, can also be included in the operating environment 100, coupled to the one or more servers and/or client device and/or coupled to the network 150, to facilitate storage and/or retrieval of data (e.g., images) by any one of the depicted devices.

The server(s) 120 can include one or more neural networks that is each trained, or can be trained, based on a generated sparse plurality of training images. In some embodiments, a trained one or more neural networks can generate an image of an object, the image having a novel viewpoint and a novel lighting direction, based on a provided (e.g., received) sparse plurality of images, a novel view point, and a novel lighting direction. In some other embodiments, the one or more neural networks can be trained to generate the image based on the provided (e.g., received) sparse plurality of images, the novel view point, and the novel lighting direction.

Figure 2:
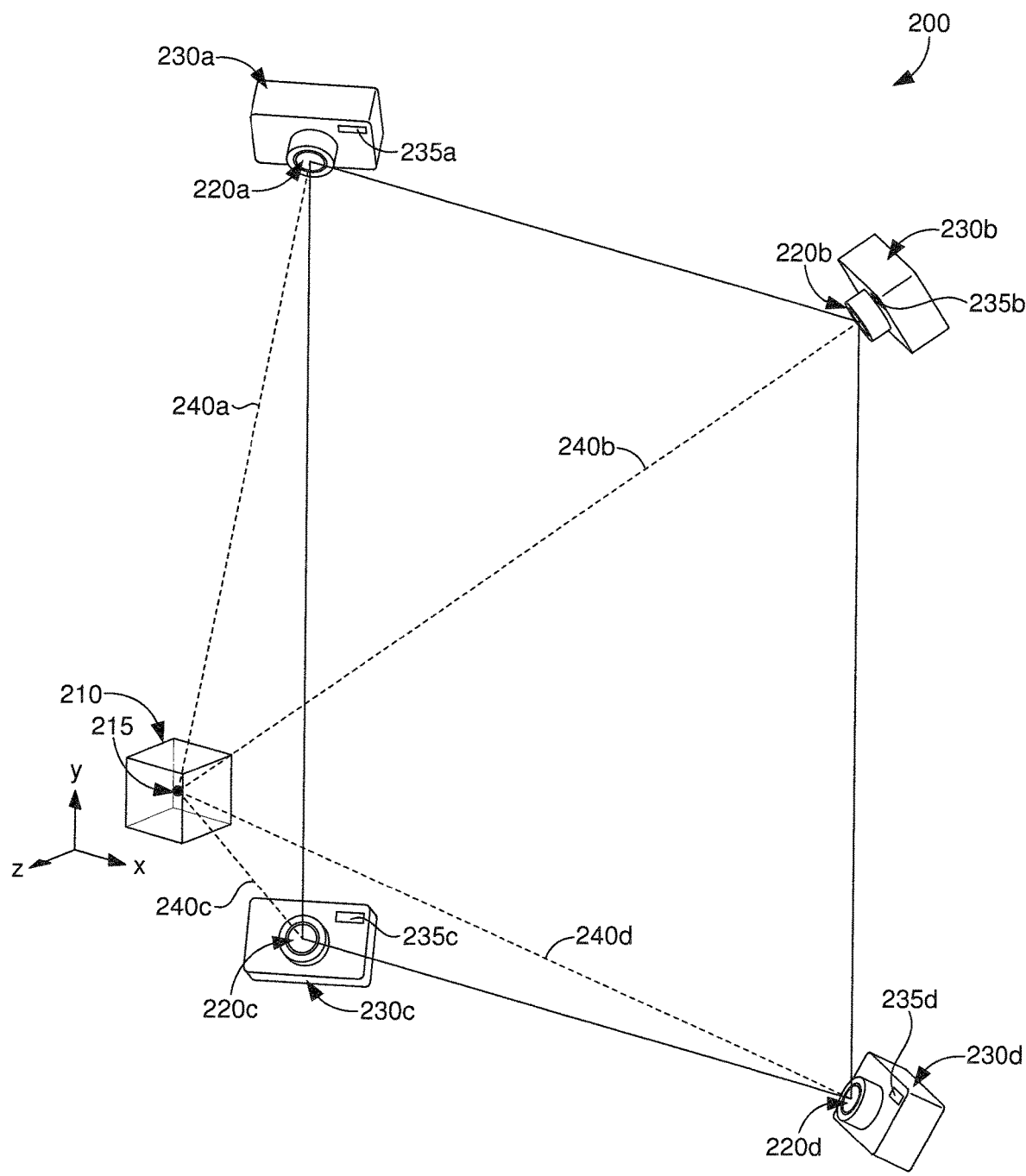
FIG. 2 is an illustration that depicts an exemplary configuration of image viewpoints and lighting directions in accordance with some embodiments.

Referring now to FIG. 2, an illustration depicts an exemplary configuration 200 of image viewpoints and lighting directions for purposes of generating a sparse plurality of images to provide as input to an image relighting and novel view generating system, such as one hosted by server(s) 120 of FIG. 1. The exemplary configuration 200 is provided to explain how the sparse plurality of images is generated, and these concepts are also relevant to the generation of training images, as will also be described.

In various embodiments, a sparse plurality of images includes images (e.g., electronic, digital photographs) of an object, such as object 210, that each correspond to one of a plurality of viewpoints and one of a plurality of lighting directions. The sparse plurality of images is preferably complete, such that every viewpoint-lighting direction combination is covered (i.e., included in the sparse plurality). For instance, images of the object 210, can be captured by cameras 230a-230d from each one of four different viewpoints 220a-220d, with collocated flashes 235a-235d directing light from each one of four different lighting directions 240a-240d, resulting in a total of sixteen unique images of the object 210. Thus, by way of the above example, the resulting sixteen unique images can be the sparse plurality of images for the object 210. In some embodiments, the flashes 235a-235d can each be a directional light coming from a theoretical hemisphere towards the object 210. In some further embodiments, each camera 230a-230d can be located around the origin 215 of the object 210 and positioned on a theoretical sphere around the origin 215 of the object 210, of which the sphere can have a variable radius.

Figure 3:
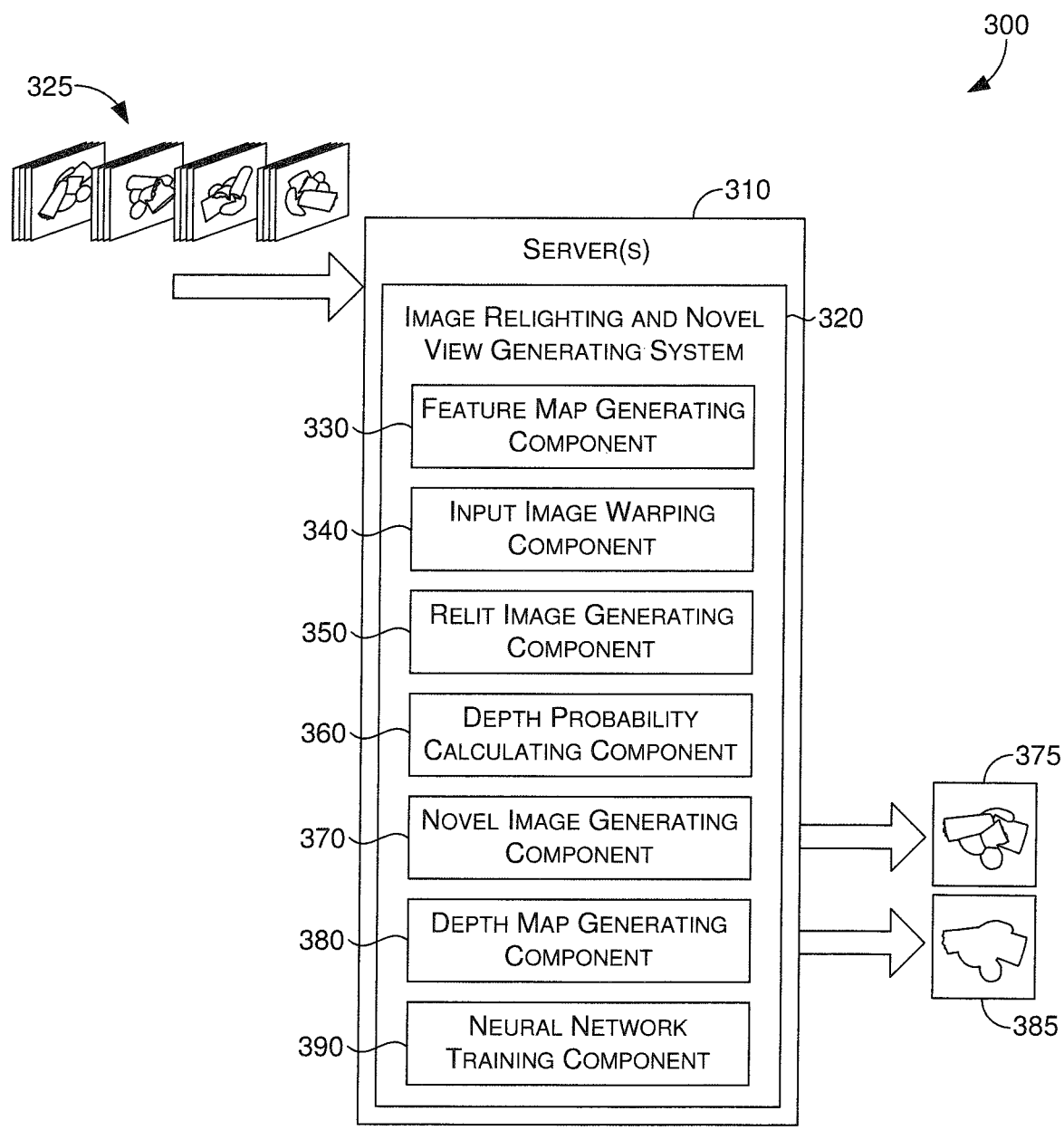
FIG. 3 is a block diagram of an exemplary image relighting and novel view generating system in accordance with some embodiments.

Looking now to FIG. 3, a block diagram is provided illustrating an exemplary system 300 having a one or more servers 310, which can host an image relighting and novel view generating system 320. In various embodiments, the system 300 can comprise one or more computing devices, such as computing device 700 of FIG. 7, one or more neural networks, one or more hardware devices or components, and/or any number of networking components, operating in a local or distributed environment to facilitate the operations described herein.

Depicted in the system 300 is the image relighting and novel view generating system 320 that can include, among other things, a feature map generating component 330, an input image warping component 340, a relit image generating component 350, a depth probability calculating component 360, a novel image generating component 370, a depth map generating component 380, and/or a neural network training component 390. As each of the described components are depicted as being included in the image relighting and novel view generating system 320 of system 300, it is contemplated that any component depicted therein is not limited to the illustrated embodiment, and can be distributed among a plurality of components or computing devices of system 300, or in some instances, may be conflated into a single component or module, such as a processor or other hardware device. It is also contemplated that any one or more of the described components can be completely removed from the system, so long as one or more operations described in correspondence to a removed component can be compensated for by one or more other components, or a third-party resource, remote computing device, or hardware device, among other things. Further, while no specific component is depicted corresponding to one or more neural networks itself, it is understood that a neural network can be comprised of or interfaces with one or more of the components depicted in system 300, or that one or more of the depicted components includes one or more portions of a neural network. In this regard, a reference to the system 300, or the components thereof, can also correspond to any one or more of the various neural networks described in accordance with the present disclosure.

In various embodiments, given a sparse plurality of images of an object, a novel viewpoint (e.g., a desired viewing perspective), and a novel lighting direction (e.g., a desired position of the light source), the image relighting and novel view generating system 320 can generate a new ("novel") image of the object, the new image corresponding to the novel viewpoint and the novel lighting direction. More specifically, a sparse plurality of images 325 of an object, such as those captured via the configuration of FIG. 2, can be received by the image relighting and novel view generating system 320 as input. In addition, the novel viewpoint and the novel lighting direction can be received as input, though such inputs can be received at any time prior to use of the inputs in the generation of the novel image.

The image relighting and novel view generating system 320 can include a set of components and one or more neural networks or neural network portions that collectively process the plurality of sparse images 325 to generate, or in other words predict, a new image having the novel viewpoint and the novel lighting direction. It is contemplated that the image relighting and novel view generating system 320 can include and employ a plurality of neural networks that collectively work together as a single neural network. As such, embodiments can be described as different neural networks utilized together, or portions of a neural network utilized together, to generate a novel image based in part on a received sparse plurality of images.

In some embodiments, the image relighting and novel view generating system 320 can include a feature map generating component 330 that can process the sparse plurality of images 325 based on each viewpoint (e.g., 220a-220d of FIG. 2) to generate a set of feature maps. The feature map generating component 330 can include a neural network that transforms photometric stereo data from the sparse plurality of images 325, specifically from the images with different lighting directions (e.g., 240a-240d of FIG. 2) for each viewpoint of the plurality of viewpoints, into a corresponding feature map. In essence, the feature map generating component 330 receives the sparse plurality of images, and for each viewpoint from which the images were captured, generates a corresponding feature map associated with the viewpoint.

In some embodiments, the image relighting and novel view generating system 320 can include an input image warping component 340 that can process the sparse plurality of images and the generated sets of feature maps to create corresponding volumes of data.

In one aspect, the input image warping component 340 can receive the novel viewpoint and the sparse plurality of images as input, and warp the images at each of a plurality of discrete depth planes based on the novel viewpoint to generate a sweeping plane volume, or in other words, a three-dimensional (3D) volume of data. The two-dimensional (2D) features (i.e., pixels) depicted from each viewpoint of the plurality of viewpoints can be warped by projecting them onto each depth plane in front of the novel viewpoint. In this way, a 3D volume of data can be generated based on multi-view 2D features (e.g., pixels, RGB values) presented in the sparse plurality of images. In some aspects, the generated 3D volume can include a plurality of voxels having a number of channels, whereby the number of channels is a function of a number of the plurality of viewpoints, a number of the plurality of lighting directions, and a number of color channels (e.g., RGB: 3 color channels) included in the images.

In another aspect, the input image warping component 340 can receive the feature maps from the feature map generating component 330, and for each feature map corresponding to one of the plurality of viewpoints, warp the feature map to generate a corresponding "viewpoint" volume. The input image warping component 340 can thus generate a viewpoint volume for each one of the plurality of viewpoints.

In some embodiments, the image relighting and novel view generating system 320 can include a relit image generating component 350 that can generate a prediction (i.e., a predictive image) for each of the plurality of discrete depth planes based on the generated 3D volume (e.g., via input image warping component 340) and the novel lighting direction received as input. More specifically, given the generated 3D volume having the plurality of voxels, the relit image generating component 350 can append each lighting direction or a representation of the lighting direction to each voxel of the 3D volume generated by the input image warping component 340. The resulting 3D volume can then be processed by the relit image generating component 350, or a neural network thereof, based on the novel lighting direction, such that a prediction (i.e., a predictive image) at every depth plane is generated (also referenced herein as "per-plane relit images"). In various embodiments, each generated prediction can include 2D features (e.g., pixels, colors) that are accurate in some portions of the resulting per-plane relit image, and incorrect in other portions of the resulting per-plane relit image, depending on the depth plane in which the 2D features appear.

In some embodiments, the image relighting and novel view generating system 320 can include a depth probability calculating component 360 that can calculate per-pixel per-plane depth probabilities for predicting probable depths for pixels in the per-plane relit images. More specifically, the depth probability calculating component 360 can receive the viewpoint volumes from the input image warping component 340, calculate mean and variance values of the viewpoint volumes, and generate a new cost volume that includes a plurality of voxels based on the calculated mean and variance values. The depth probability calculating component 360 can then append each voxel with its corresponding depth value to generate a modified cost volume that is processed by the depth probability calculating component 360, or a neural network thereof, to generate an output volume of per-pixel per-plane depth probabilities. In some aspects, the generated per-pixel per-plane depth probabilities can be normalized by applying a soft-max on the output volume along corresponding depth dimensions.

In some embodiments, the image relighting and novel view generating system 320 can include a novel image generating component 370 that can determine a weighted-sum of the per-plane relit images (e.g., from relit image generating component 350) based on the per-pixel per-plane depth probabilities (e.g., from depth probability calculating component 360). By doing so, the novel image generating component 370 can generate a new image (i.e., the novel image) 375 that corresponds to the novel viewpoint and the novel lighting direction.

In some embodiments, the image relighting and novel view generating system 320 can include a depth map generating component 380 that can determine a weighted-sum of the per-plane depth values based on the per-pixel per-plane depth probabilities. By doing so, the depth map generating component 380 can generate a final depth image or a depth map 385 that is associated with the final image. It is contemplated, however, that the depth map generating component 380 is only utilized for purposes of training the neural network(s) of the image relighting and novel view generating system 320, and can be disabled when the image relighting and novel view generating system 320 is utilized in a production environment.

In some embodiments, the image relighting and novel view generating system 320 can include a neural network training component 390 that can generate training images along with ground truth images and depth maps for particular viewpoint(s) and particular lighting direction(s) that are different from the training images. More so, the neural network training component 390 can provide the training images, particular view point(s), and particular lighting direction(s) to the image relighting and novel view generating system 320 as input, so that a predictive novel image (e.g., via novel image generating component 370) and a predictive depth map (e.g., via depth map generating component 380) is generated. The neural network training component 390 can then employ the ground truth image(s) and ground truth depth map(s), which may correspond to or contrast with the predictive novel image and predictive depth map, to retrain the image relighting and novel view generating system 320, or neural network(s) thereof.

In some embodiments, training images for training an image relighting and novel view generating system 320 can be generated utilizing concepts derived from the generation of sparse images, also described in accordance with FIG. 2. In various embodiments, the training images can include images that are not photographed, but rendered (i.e., "synthetic data"). Somewhat similar to the steps described in FIG. 2 for generating the sparse plurality of images, a synthetic object (e.g., a 3D model) can be rendered, such that each rendering of the synthetic object can correspond to one of a plurality of viewpoints and one of a plurality of lighting directions. In some embodiments, the synthetic object can include a variety of cubes, ellipsoids, cylinders, and/or other multi-faceted shapes, and can have random sizes, which can also be textured with random crops. For instance, following FIG. 2 merely as a guide, renderings (or corresponding images) of the synthetic object can be captured from each one of four different viewpoints 220a-220d, with collocated rendered light sources 235a-235d directing light from each one of four different lighting directions 240a-240d, resulting in a total of sixteen unique renderings or images of the synthetic object. Thus, by way of the above example, the resulting sixteen unique images can be one set of training images. In some embodiments, the light sources 235a-235d can each be a directional light coming from a theoretical hemisphere towards the synthetic object. In some further embodiments, each viewpoint 230a-230d can be located around the origin 215 of the synthetic object and positioned on a theoretical sphere around the origin of the synthetic object, of which the sphere can have a variable radius.

An advantage of utilizing renderings of synthetic objects for creating training data is the low-cost ability to determine a ground truth image and a ground truth depth map of the image from a particular viewpoint and a particular lighting direction. The ground truth image and ground truth depth map, in addition to a relit image predicted by the image relighting and novel view generating system 320, can be employed to train the image relighting and novel view generating system. Thus, a plurality of training images can be generated for each synthetic object, which can include the sparse plurality of training images (e.g., having each unique combination of viewpoint and lighting direction), and a plurality of ground truth images and depth maps. In various embodiments, each ground truth image is different from the training images, and corresponds to a particular (e.g., novel) viewpoint and a particular (e.g., novel) lighting direction provided as input.

Figure 4A:
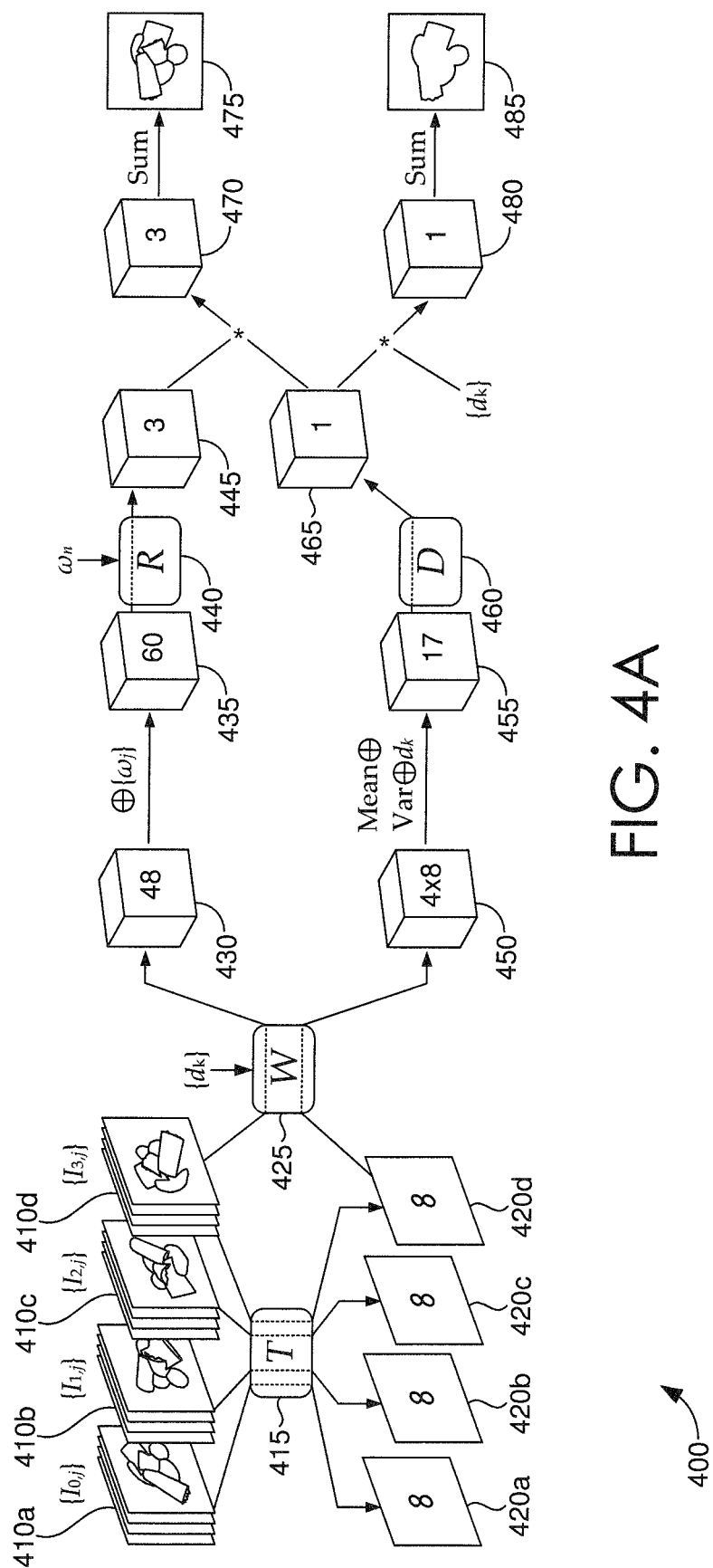
FIGS. 4A-4D each depict a schematic for an exemplary neural network framework of an image relighting and novel view generating system in accordance with some embodiments.
Figure 4B:
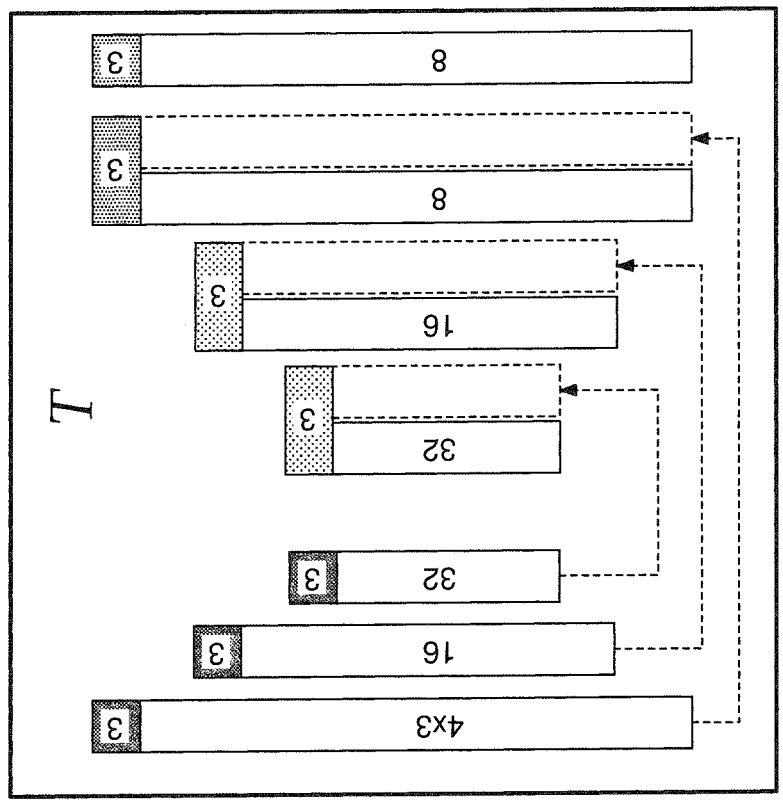
Figure 4C:
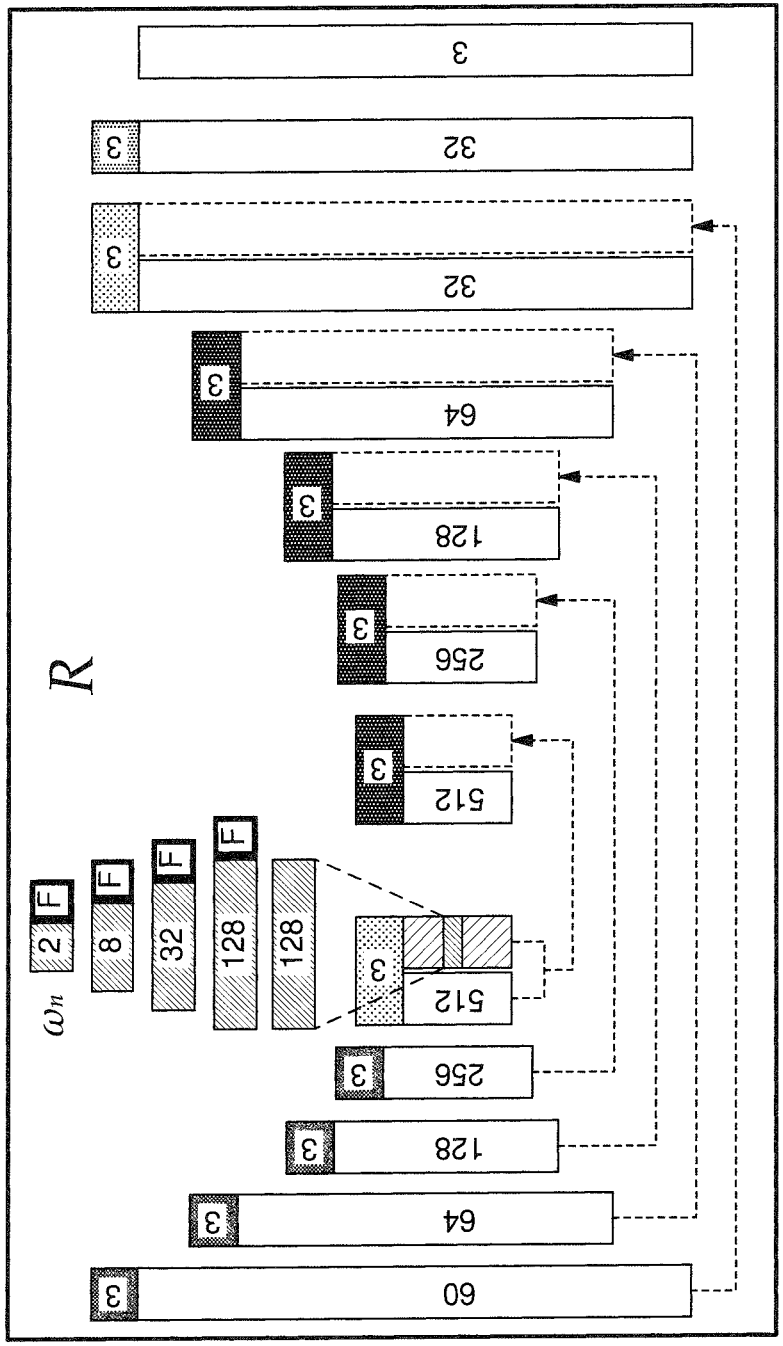
Figure 4D:
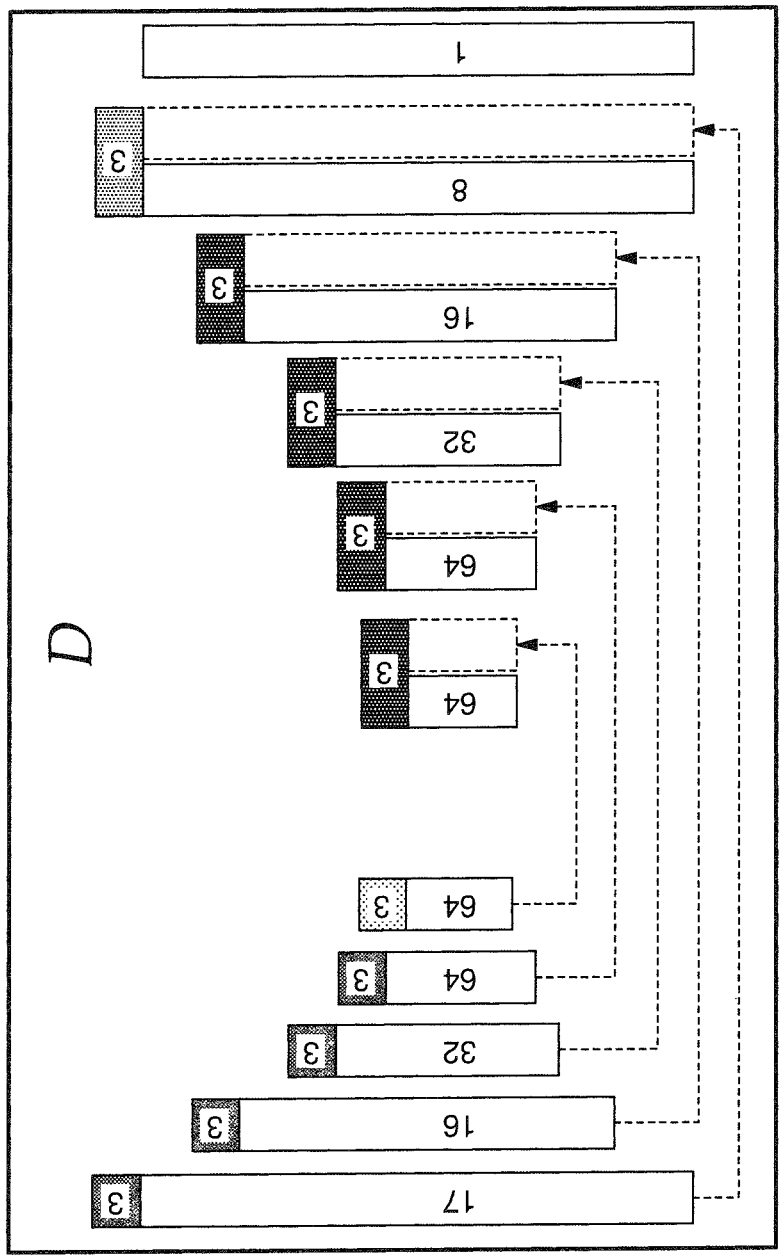

Looking now to FIGS. 4A-4D, a schematic of an exemplary framework for implementing an image relighting and novel view generating system 400, such as image relighting and novel view generating system 320 of FIG. 3, is depicted in accordance with some embodiments. In this example, an assumption is made that the object depicted in the images 410a-410d of FIG. 4A has a limited size $d_s$, and a volume has D discrete depth plans with depth values $\{d_k|k=1, 2, \ldots, D\}$, where in this example, D=64, and $d_s$=9. More so, the inputs to image relighting and novel view generating system 400 include the plurality of sparse images 410a-410d (input images $\{I_{i,j}|i=1; 2; 3; 4; j=1, 2, 3, 4\}$), a novel light direction $\omega_n$; and a discrete plurality of depth values $\{d_k|k=1, 2, \ldots, D\}$. A light direction $\omega_j$ can be represented by the x, y, z values of its unit vector, in a novel view's camera coordinate frame. In this example, the denoted view id is i, the light id is j, and the depth plane id is k. For purposes of description, FIG. 4A is utilized as the main framework through which processes may occur within the image relighting and novel view generating system 400, while FIGS. 4B-4D are provided as exemplary legends to FIG. 4A.

FIG. 4A depicts a plurality of sparse images 410a-410d, which can be captured in accordance with the techniques described in FIG. 2, and grouped into stacks 410a, 410b, 410c, 410d by viewpoint. Here, neural network W 425 can perform a warping function, such as one performed by input image warping component 340 of FIG. 3, given the plurality of sparse images 410a-410d and a novel viewpoint received as input. Utilizing the warping function, the sparse plurality of images 410a-410d (i.e., the multi-view multi-light input data) are all warped to a big volume 430 via W, where each voxel of the volume 430 has 48 channels. As noted, the volume 430 has D discrete depth plans with depth values $\{d_k|k=1, 2, \ldots, D\}$, so for kth depth plane, 2D features from all input views are warped to the plane by projecting them onto the plane at depth $d_k$ in front of the novel view. Assuming that a center of the depicted object has a distance $d_v$, a sweeping volume 430 can be determined by calculating each $d_k=d_v-d_s/2+d_s(k-1)/(D-1)$. In this way, a 3D volume data (e.g., volume 430) is generated based on multi-view 2D features.

As described in accordance with the relit image generating component 350, the light directions $\{\omega_j|j=1, 2, 3, 4\}$ can be appended to each voxel of the volume 430 to generate a sixty (60)-channel volume 435 that is then processed by neural network R 440. Neural network R 440, which can include a 3D UNet-style convolutional neural network, can process the volume 435 and a novel lighting direction $\omega_n$ to generate a predictive, relit image at every depth plane. Thus, neural network R 440 can generate a volume of per-plane relit images 445.

On the other hand, FIG. 4A also depicts neural network T that processes, as described in accordance with feature map generating component 330 of FIG. 3, each stack 410a, 410b, 410c, 410d into eight (8)-channel feature maps 420a, 420b, 420c, 420d that can be utilized by neural network D 460 to predict depth probabilities. Each of the eight (8)-channel feature maps 420a, 420b, 420c, 420d can then be warped via neural network W 425 to generate four eight (8)-channel viewpoint volumes 450. Then, as described in accordance with depth probability calculating component 360 of FIG. 3, the mean and variance of the viewpoint volumes 450 can be calculated to generate a new cost volume having sixteen (16) channels, with eight (8) mean values plus eight (8) variance values. Each voxel of the viewpoint volumes 450 can be appended to a corresponding depth value $d_k$ to generate a seventeen (17)-channel volume 455. As further described in accordance with depth probability calculating component 360 of FIG. 3, the seventeen (17)-channel volume 455 can be provided as input to a neural network D 460, which can include a 3D UNet-style convolutional neural network, which predicts an output volume 465 including the per-pixel depth probabilities at all depth planes. In some aspects, the per-pixel probabilities can be normalized by applying a soft-max on the output volume 465 along the depth dimension.

As described with respect to the novel image generating component 370, a weighted-sum 470 of the per-plane relit images 445 utilizing the per-pixel depth probabilities 465 is determined to generate the final, novel image $I_n$ 475 corresponding to the novel viewpoint and the novel lighting direction $\omega_n$. As described with respect to the depth map generating component 380, a weighted-sum 480 of the per-plane depth values $\{d_k|k=1, 2, \ldots, D\}$ utilizing the per-pixel depth probabilities 465 is determined to generate the depth image or depth map $d_n$ 485 of the novel image $I_n$ 475. To this end, the output of the image relighting and novel view generating system 400 includes a new, relit image 475 from a novel viewpoint under a novel lighting direction, and a depth map 485 associated with the relit image 475.

Figure 5:
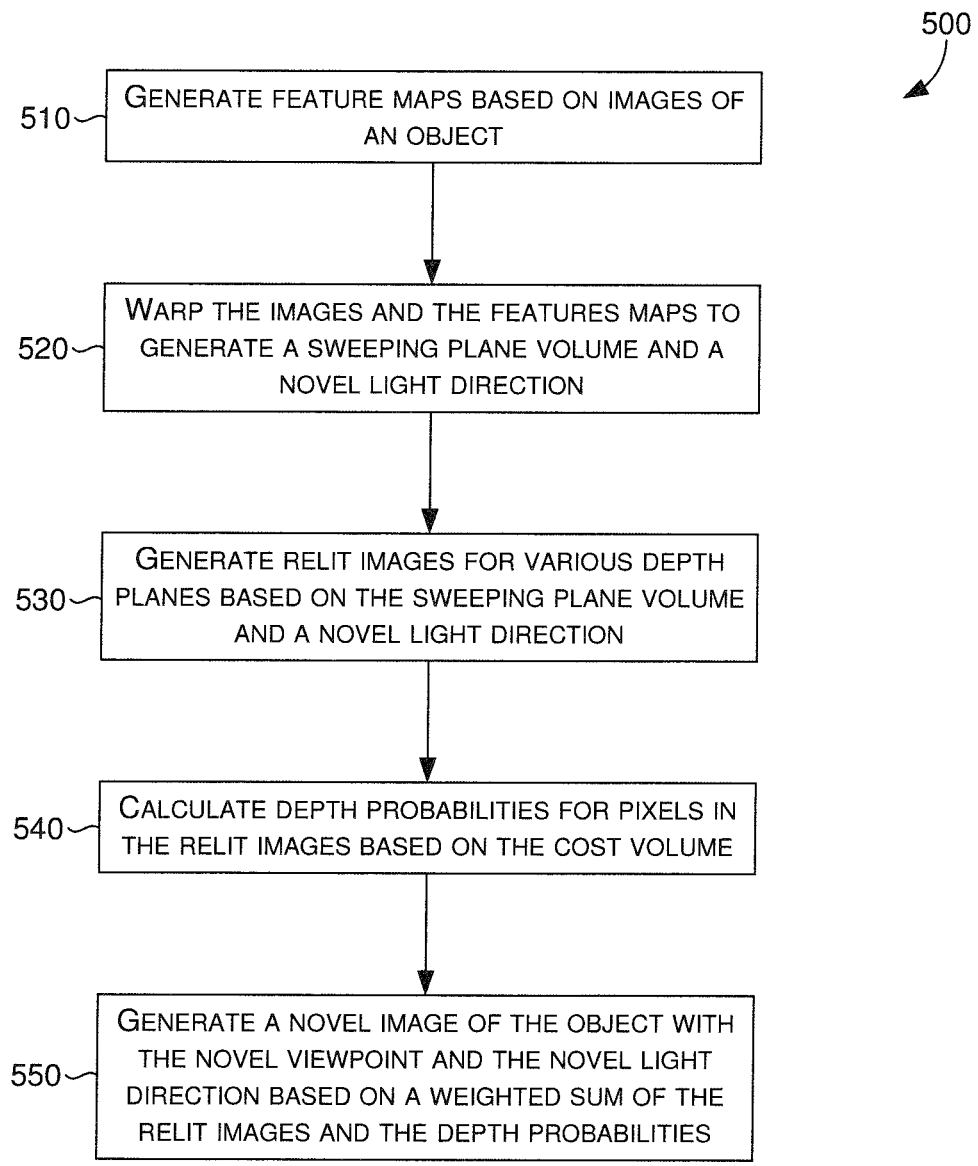
FIG. 5 is a flow diagram showing a method for generating a relit image having a novel viewpoint and novel lighting direction in accordance with some embodiments.

Turning now to FIG. 5, a flow diagram is provided that illustrates a method for generating a relit image having a novel viewpoint and a novel lighting direction, in accordance with some embodiments described herein. In some embodiments, an image relighting and novel view generating system, such as image relighting and novel view generating system of FIG. 3, can receive a sparse plurality of images. In various embodiments, the images can be received directly, via a network, or from a client device, such as client device 140 of FIG. 1. In various embodiments, the sparse plurality of images includes images of an object, where each image is captured from one of a plurality of viewpoints, and with one of a plurality of lighting directions, as described in accordance with FIG. 2.

In some embodiments, at block 510, the image relighting and novel view generating system can generate a plurality of feature maps based on the received sparse plurality of images. More specifically, a feature map generating component, such as feature map generating component 330 of FIG. 3, can employ a neural network that analyzes the images for each viewpoint of the plurality of viewpoints, and generates a corresponding feature map for each viewpoint.

At block 520, a sweeping plane volume and a cost volume can be generated based on the received sparse plurality of images and the generated feature maps. More specifically, an input image warping component, such as input image warping component 340 of FIG. 3, can process the sparse plurality of images and the generated sets of feature maps to create corresponding volumes (e.g., sweeping plane, cost).

In some embodiments, the input image warping component can receive the novel viewpoint and the sparse plurality of images as input, and warp the images at each of a plurality of discrete depth planes based on the novel viewpoint. The two-dimensional (2D) features (i.e., pixels) depicted from each viewpoint of the plurality of viewpoints can be warped by projecting them onto each depth plane in front of the novel viewpoint. In this way, a 3D volume of data, such as volume 430 of FIG. 4, can be generated based on multi-view 2D features (e.g., pixels, RGB values) presented in the sparse plurality of images. The generated 3D volume can include a plurality of voxels having a number of channels, whereby the number of channels is a function of a number of the plurality of viewpoints, a number of the plurality of lighting directions, and a number of color channels (e.g., RGB: 3 color channels) included in the images. In some further embodiments, the input image warping component can receive the feature maps from the feature map generating component, and for each feature map corresponding to one of the plurality of viewpoints, warp the feature map to generate a corresponding viewpoint volume. The input image warping component can thus generate a viewpoint volume for each one of the plurality of viewpoints, as similarly depicted as viewpoint volumes 450 of FIG. 4.

At block 530, a relit image generating component, such as relit image generating component 350 of FIG. 3, can generate a prediction (e.g., a predictive image) for each of the plurality of discrete depth planes based on the generated 3D volume (e.g., via input image warping component) and the novel lighting direction received as input. Given the generated 3D volume having the plurality of voxels, the relit image generating component can append each lighting direction or a representation of the lighting direction to each voxel of the 3D volume generated by the input image warping component. The resulting 3D volume can then be processed by the relit image generating component, or a neural network thereof, based on the novel lighting direction, such that per-plane relit images are generated.

At block 540, a depth probability calculating component, such as depth probability calculating component 360 of FIG. 3, can calculate per-pixel per-plane depth probabilities to predict probable depths for pixels in the per-plane relit images. The depth probability calculating component can receive the viewpoint volumes from the input image warping component, calculate mean and variance values of the viewpoint volumes, and generate a new cost volume that includes a plurality of voxels based on the calculated mean and variance values. The depth probability calculating component can then append each voxel with its corresponding depth value to generate a modified cost volume that is processed by the depth probability calculating component, or a neural network thereof, to generate an output volume of per-pixel per-plane depth probabilities. In some aspects, the generated per-pixel per-plane depth probabilities can be normalized by applying a soft-max on the output volume along corresponding depth dimensions.

At block 550, a novel image generating component, such as novel image generating component 370 of FIG. 3, can determine a weighted-sum of the per-plane relit images (e.g., from relit image generating component) utilizing the per-pixel per-plane depth probabilities (e.g., from depth probability calculating component). In doing so, the novel image generating component can generate a new image (i.e., the novel image) that corresponds to the novel viewpoint and the novel lighting direction. The novel image generating component can then provide the generated new image as output, provide it for display to a display coupled to the image relighting and novel view generating system, or communicate the generated new image to a client device, such as client device 140 of FIG. 1, for display thereby.

Figure 6:
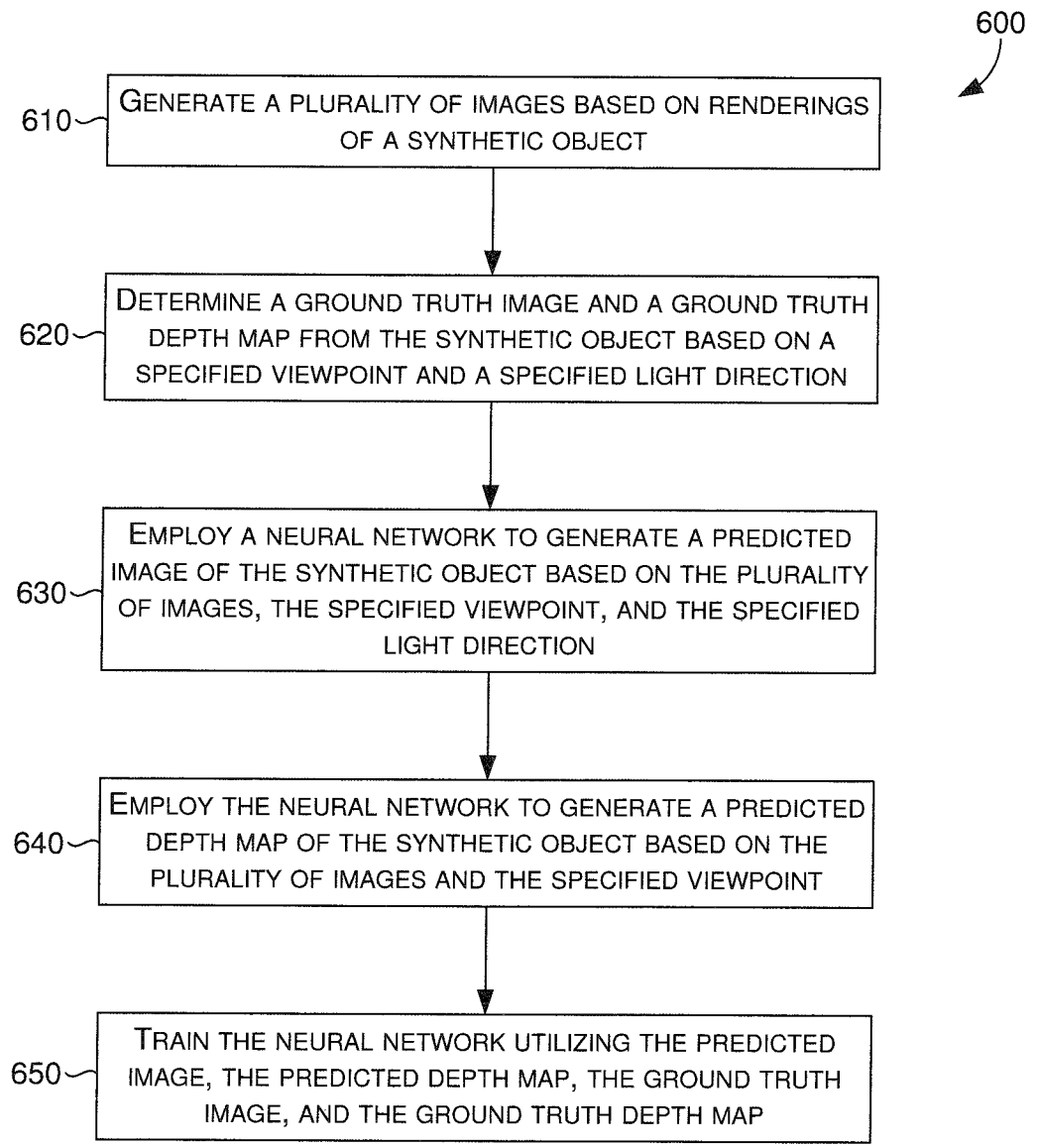
FIG. 6 is a flow diagram showing a method for training a neural network that generates a relit image having a novel viewpoint and novel lighting direction in accordance with some embodiments.

Turning now to FIG. 6, a flow diagram is provided that illustrates a method for training a neural network that generates a relit image having a novel viewpoint and a novel lighting direction, in accordance with some embodiments described herein. In some embodiments, an image relighting and novel view generating system, such as image relighting and novel view generating system of FIG. 3, can include a neural network training component, such as neural network training component 390.

At block 610, the neural network training component can generate a sparse plurality of training images based on a 3D model of a synthetic object. The sparse plurality of training images can have images of the synthetic object, corresponding to one of a plurality of viewpoints and one of a plurality of lighting directions, as similarly described in accordance with neural network training component 390 of FIG. 3. To generate the sparse plurality of training images, the 3D model can be rendered such that desired viewpoint(s) and lighting direction(s) are perceived in the images. The renderings can be captured, such that all possible combinations of viewpoint(s) and lighting direction(s) are generated.

At block 620, utilizing the 3D model, a ground truth image of the synthetic object, corresponding to a particular viewpoint and a particular lighting direction can be rendered. The ground truth image can be compared (e.g., for neural network training purposes) against an output image generated by the image relighting and novel view generating system when given the sparse plurality of training images, the particular viewpoint, and the particular lighting direction as input. Similarly, a ground truth depth map corresponding to the ground truth image can also be rendered. Provided that a 3D model is being utilized, the depth values can be easily determined and extracted, so that a precise ground truth depth map can be compared (e.g., for neural network training purposes) against an output depth map generated by the image relighting and novel view generating system when given the sparse plurality of training images, the particular viewpoint, and the particular lighting direction as input.

At block 630, the sparse plurality of training images, the particular viewpoint, and the particular lighting direction can be provided as input to the image relighting and novel view generating system. As described in accordance with some embodiments, the image relighting and novel view generating system can generate (e.g., predict) a new image of the synthetic object corresponding, assumedly, to the particular viewpoint and particular lighting direction. More so, at block 640, the image relighting and novel view generating system can generate a depth map associated with the generated new image.

Given the generated new image, the generated depth map, the ground truth image, and the ground truth depth map as outputs, the neural network training component can receive the foregoing as training inputs, which can be communicated back to the image relighting and novel view generating system, or the neural network(s) thereof, to guide and improve its depth probability predictions, as described in accordance with depth probability calculating component 360 of FIG. 3. It is contemplated that in accordance with some embodiments, the image relighting and novel view generating system, or the neural network(s) thereof, are trained on supervised losses on images and depths (e.g., a comparison of generated new images and depth maps against ground truth images and ground truth depth maps).

Figure 7:
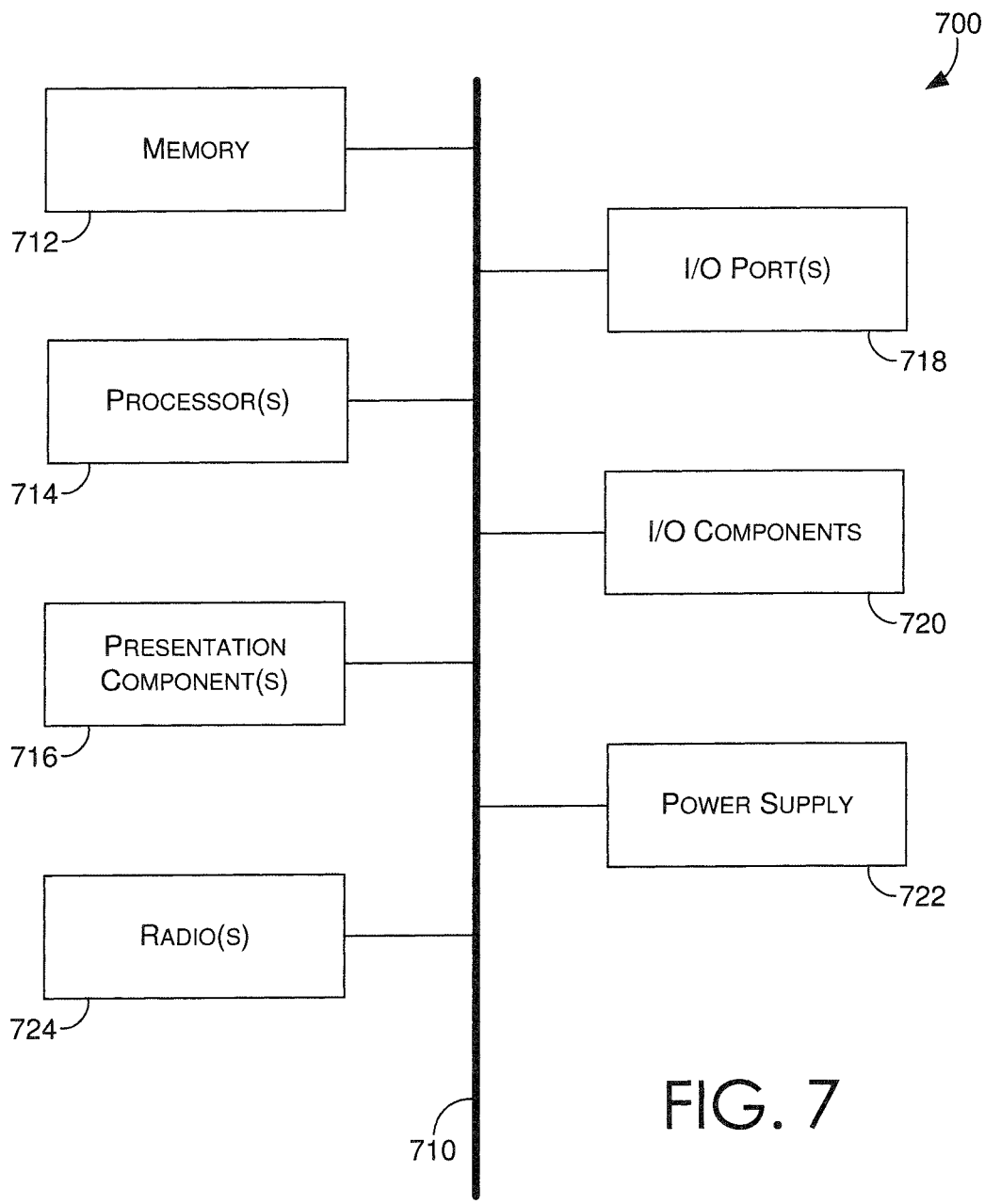
FIG. 7 is a block diagram of an exemplary computing environment suitable for use in implementing some embodiments.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

As can be understood, embodiments of the present invention provide for, among other things, generating figure captions for electronic figures. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method for generating a novel image of an object, the method comprising:

generating, by at least one processor with a first portion of a neural network, a plurality of feature maps based on a plurality of images, wherein each image of the plurality of images corresponds to one of a plurality of viewpoints and one of a plurality of lighting directions;

generating, by the at least one processor with a second portion of the neural network, a sweeping plane volume and a cost volume, wherein the sweeping plane volume is generated based on a size of the object, a plurality of distances from the object to the plurality of viewpoints, and a number of depth planes in a plurality of depth planes;

generating, by the at least one processor with a third portion of the neural network, a relit image for each depth plane of the plurality of depth planes based on the sweeping plane volume and a novel lighting direction, wherein each relit image includes a corresponding plurality of pixels;

calculating, by the at least one processor with a fourth portion of the neural network, a depth probability for each pixel of the corresponding plurality of pixels in each relit image based on the cost volume; and generating, by the at least one processor, the novel image of the object based on a weighted sum of the relit images and the calculated depth probabilities, the novel image corresponding to the novel viewpoint and the novel lighting direction.

2. The method of claim 1, wherein each viewpoint of the plurality of viewpoints is collocated with one of the plurality of lighting directions.

3. The method of claim 2, wherein the plurality of viewpoints is radially and symmetrically distributed at a distance apart from the object.

4. The method of claim 3, wherein the novel viewpoint and the novel lighting direction are each within a boundary defined by the plurality of viewpoints.

5. The method of claim 1, wherein the relit image for each depth plane of the plurality of defined depth planes is generated based further on appending the plurality of lighting directions to the sweeping plane volume.

6. The method of claim 1, wherein a plurality of volumes is generated based on warping the plurality of feature maps, and the cost volume is generated by further calculating a mean and a variance of the plurality of volumes.

7. The method of claim 1, wherein the novel image is generated based further on normalizing the calculated depth probabilities.

8. The method of claim 1, wherein the plurality of images is warped based further on a defined set of camera calibration matrices.

9. The method of claim 1, further comprising:
generating, by the at least one processor, a depth map of the novel image based on a weighted sum of the plurality of depth planes and the calculated depth probabilities.

10. A non-transitory computer storage medium storing computer-useable instructions that, when used by one or more computing devices, cause the one or more computing devices to perform operations comprising:
generating a plurality of feature maps based on a plurality of images of an object, wherein each image of the plurality of images corresponds to one of a plurality of viewpoints and one of a plurality of lighting directions;
appending the plurality of lighting directions to a sweeping plane volume that is generated based on a size of the object, a plurality of distances from the object to the plurality of viewpoints, and a number of depth planes in a plurality of depth planes;
generating a cost volume by calculating a mean and a variance of a plurality of volumes that is generated by warping the plurality of feature maps;
generating a relit image for each depth plane of the plurality of depth planes based on the sweeping plane volume and a novel lighting direction, wherein each relit image includes a corresponding plurality of pixels;
calculating a depth probability for each pixel of the corresponding plurality of pixels in each relit image based on the cost volume; and
generating a novel image of the object based on a weighted sum of the relit images and the calculated depth probabilities, the novel image corresponding to the novel viewpoint and the novel lighting direction.

11. The medium of claim 10, wherein each viewpoint of the plurality of viewpoints is collocated with one of the plurality of lighting directions.

12. The medium of claim 11, wherein the plurality of viewpoints corresponds to four viewpoints that are radially and symmetrically distributed at a distance apart from the object.

13. The medium of claim 12, wherein the novel viewpoint and the novel lighting direction are each within a boundary defined by the plurality of viewpoints.

14. The medium of claim 10, wherein the plurality of images is warped based further on a defined set of camera calibration matrices associated with the plurality of images.

15. The medium of claim 10, wherein the object has the size ($d_s$), each distance ($d_v$) of the plurality of distances corresponds to a length between a center of the object and each of the plurality of viewpoints, the plurality of depth planes includes a defined number (D) of depth planes having corresponding depth values ($d_k$) for each (kth) depth plane, and the sweeping plane volume is generated by calculating each corresponding depth value ($d_k$) utilizing $d_k=d_v-d_s/2+d_s(k-1)/(D-1)$.

16. A computerized system comprising:
a feature map generating means for generating a plurality of feature maps based on a plurality of images of an object, wherein each image of the plurality of images corresponds to one of a plurality of viewpoints and one of a plurality of lighting directions;
a warping means for warping the plurality of images to generate a sweeping plane volume, and for warping the plurality of feature maps to generate a cost volume, wherein the sweeping plane volume is generated based on a size of the object, a plurality of distances from the object to the plurality of viewpoints, and a number of depth planes in a plurality of depth planes;
a relit image generating means for generating a relit image for each depth plane of the plurality of depth planes based on the sweeping plane volume and a novel lighting direction, wherein each relit image includes a corresponding plurality of pixels;
a depth probability calculating means for calculating a depth probability for each pixel of the corresponding plurality of pixels in each relit image based on the cost volume; and
a novel image generating means for generating the novel image of the object based on a weighted sum of the relit images and the calculated depth probabilities, the novel image corresponding to the novel viewpoint and the novel lighting direction.

17. The system of claim 16, further comprising:
a depth map generating means for generating a depth map of the novel image based on a weighted sum of the plurality of depth planes and the calculated depth probabilities.

18. The system of claim 17, further comprising:
a neural network training means for
generating the plurality of images of the object based on a three-dimensional model;
determining a ground truth novel image and a ground truth depth map based on the three-dimensional model;
employing a neural network comprising the feature map generating means, the warping means, the relit image generating means, the depth probability calculating means, the novel image generating means, and the depth map generating means to generate the novel image and the depth map; and
training the neural network based on the generated novel image, the generated depth map, the determined ground truth novel image, and the determined ground truth depth map.

19. The system of claim 16, wherein the relit image for each depth plane of the plurality of defined depth planes is generated based further on appending the plurality of lighting directions to the sweeping plane volume.

20. The system of claim 16, wherein a plurality of volumes is generated based on warping the plurality of feature maps, and the cost volume is generated by further calculating a mean and a variance of the plurality of volumes.

\* \* \* \* \*